3,094,428
COMPOSITION OF METAL OXIDES AND CARBON BLACK

Paul M. Hamilton, Dayton, Ohio, and George B. Kistiakowsky, South Lincoln, Mass., assignors to Monsanto Chemical Company, St. Louis, Mo., a corporation of Delaware
No Drawing. Filed June 7, 1957, Ser. No. 664,184
5 Claims. (Cl. 106—307)

This invention relates to compositors of metal oxides in combination with carbon black as an intimate admixture containing from 10% to 50% by weight of carbon. It is an object of the invention to produce compositions which are of particular utility as pigments and in the manufacture of electrical components. It is likewise an object of the present invention to provide mixtures of metal oxides such as silica, titanium dioxide or alumina, together with carbon black, which mixtures are readily formulated into various rubber compositions and products such as masterbatches, tire tread stocks and hard rubber.

It is also an object of the invention to provide a method for the production of combinations of silica and carbon black as the result of a chemical reaction between silicon tetrachloride, oxygen and an unsaturated hydrocarbon such as acetylene. The oxides which are contemplated in the present invention include individual oxides and combinations of the oxides of the following metals: boron, silicon, aluminum, titanium, zirconium, zinc, lead and tin, which group is of particular utility as a pigment. Another group of oxides contemplated in the present invention are the oxides of iron, cobalt, nickel, manganese, chromium, vanadium, molybdenum, niobium and tantalum, which group is likewise contemplated both in the form of individual oxides and combinations thereof together with carbon. The combinations of two or more oxides may also include members taken from the two groups, for example, titanium dioxide, together with cobalt oxide in combination with finely divided carbon black as described above.

The combinations of 10% to 50% by weight of carbon with the remainder of the composition being a metal oxide in intimate admixture have the unusual property of being easily wetted by water. In this way the present combinations differ from carbon black which is difficult to wet or to disperse in water. The oxide-carbon black mixtures may therefore be utilized in the preparation of water-dispersible paints.

Silica, alumina, or titanium dioxide in combination with carbon black as prepared by the process of the present invention are of particular utility in the preparation of coating compositions utilizing conventional paint vehicles or aqueous vehicles such as water. Thus, the present combination of the oxide and carbon black are readily dispersed in alcohol, benzene, turpentine, mineral spirits, linseed oil, etc. These dispersions may be incorporated in ink, coating compositions, rubber and other natural or synthetic resins.

The present oxide-carbon black products are found to be readily mixed into rubber compositions in roll mixing or Banbury mixing. The mixtures thus prepared may be used in the formulation of various rubber products, for example, hard rubber and tire stocks. The combinations are particularly advantageous in formulating rubber, since the intimate admixture of the oxide and carbon black provide a balance between the properties of tensile strength, elongation, modulus and hardness.

The product of the present invention is likewise of great utility in the preparation of masterbatches. In the polymerization of synthetic rubber latices, the combination of silica and carbon black, for example, is found to be readily dispersed in aqueous systems, such as may be employed in synthetic rubber formulations based upon polybutadiene, or copolymers of butadiene and styrene. This combination of silica and carbon black thus provides both the reinforcing and pigmenting properties of the silica and the carbon black in a unitary composition which is particularly applicable for formulation in rubber.

It has also been found that the combination of silica and carbon black is improved in pelleting qualities compared to conventional carbon black. The processing of the present chemical product may thus be carried out to obtain pellets or agglomerates, for example, by conducting the treating operation of the present invention in a primary oxidation step as described hereinafter and following this by treatment of the primary product in a pelleting mill. If desired, the pelleting operation may be employed as a later step upon the product leaving the reaction vessel.

In addition to the utilization of the said oxide-carbon combinations as pigments and in compounding rubber and plastics, these products are of utility as a raw material in the preparation of carbides and of finely-divided metals in elemental form.

It has been found that the finely-divided form in which the present oxide-carbon admixture is obtained renders the mixture particularly useful for the production of carbides, such as a mixed carbide of cobalt and titanium. Such carbide formation may be conducted by a heating step in which the elemental carbon undergoes reaction with the metal oxide. The unusually finely-divided form and intimate admixture of these two components is advantageous in conducting such a reaction, since it makes it possible to form the carbide at a lower reaction temperature and with a shorter reaction time as well as resulting in a more complete reaction. It has also been found that such a carbide production method has advantages over conventional methods because of the closer control of the stoichiometry, and the elimination of a mechanical mixing step.

The process of the present invention involves an oxidation reaction utilizing an oxygen-containing reducing flame in order to obtain specific proportions of carbide of the said metals, as well as the elemental metals in combination with the oxides. Thus, the oxidation of metal salts, for example, chlorides when conducted in accordance with the present invention with an oxygen-deficient reducing flame may be conducted to provide a mixture of the oxides together with carbon black as well as minor proportions of the metal carbides and the elemental form of the metals.

The present process for the production of intimate mixtures of metal oxides and carbon black is essentially a controlled vapor phase reaction conducted in an oxygen containing reducing flame. The starting materials for this process may be one or more vaporizable or soluble compounds of the following metals: boron, silicon, aluminum, titanium, zirconium, zinc, lead, tin, iron, cobalt, nickel, manganese, chromium, vanadium and molybdenum metals are introduced into the process as compounds or salts which are soluble in water or organic solvents, i.e., the halides, for example, the chlorides, bromides, and iodides and also nitrates, acetates, oxalates, tartrates, etc. The said compounds may be employed in the anhydrous form or as any hydrate such as the dihydrate or tetrahydrate. The concentration of the metal compounds in the solution fed to the reaction flame may range from 1% by weight (anhydrous basis) to as high as the saturation limit. The solvent is preferably water, although other inorganic or roganic solvents may also be used to advantage. Typical organic solvents for the present process are alcohols or ketones as representative inert, combustible, organic liquids. The organic solvents employed for the present purpose have less than 5 carbon atoms in the molecular, for example, ethanol, n-propanol, isopropanol, butanol, isobutanol, tert.-butanol, methyl ethyl ketone, acetone, or dioxane.

In the embodiment of the present invention using a metal salt dissolved in an organic solvent, the employment of the solvent makes it possible to achieve an extremely rapid atomization as the liquid feed stream passes from the nozzle into the oxidation zone. In the use of an organic solvent, it is also found that the presence of the large amount of organic solvent gases and gaseous combustion products prevents undesirable rapidity of oxidation.

In carrying out the oxidation process of the present invention, the solution of the metal salt is first atomized by admixture with an atomizing gas which may be inert (for example nitrogen), or may contain oxygen either as a pure stream of oxygen or as air. The atomizing gas may also be combustible, for example, hydrogen or natural gas may be used. One embodiment of the invention is to supply the flame with an unsaturated hydrocarbon having from 2 to 8 carbon atoms. The atomizing gas stream is supplied in sufficient quantity to atomize the liquid feed. Secondary gas streams such as an auxiliary air stream may also be employed in order to promote complete combustion, and to prevent the deposition of oxides on the walls of the oxidation vessel. The present oxidation process is carried out at a high temperature so that it is desirable to provide a refractory vessel which may be vertically or horizontally disposed. The particles leaving the oxidation zone are cooled by direct or indirect heat exchange and are then collected by suitable means such as a water spray or wetted wall tower, a cyclone separator, electrostatic precipitator, bag filters, etc. The particles have an average particle size of from 200 to 1000 angstroms, or preferably from 200 to 700 angstroms.

When combustion occurs, the fuel gas and/or the solvent gases are burned as an oxygen-containing reducing flame to provide uniform heating and at the same time permit oxidation of the metal salts to the corresponding oxides without permitting excess crystal growth at this stage. The atomizing carrier gas may be employed in the minimum amount required to atomize the solution or may be used in excess, for example, in the amount required for combustion in order to heat the mixture to reaction temperature. The combinations of an intimate admixture of carbon black and the oxides are obtained when operating with a flame temperature of from 800° C. to 1,800° C., a preferred range being from 1,000° C. to 1,400° C. for a period of time of 0.5 second to 0.001 second, a preferred range being from 0.1 second to 0.01 second. In order to provide for sufficient heat in the oxidation step, secondary air or gas may also be provided. The combustion of the hydrogen, carbon monoxide, natural gas, or other combustible gas with air or oxygen thus provides a major source of heat necessary for the oxidation. In those instances in which an organic liquid solvent is employed, additional heat is supplied by the combustion of such organic liquid. The combustible components are supplied in amount sufficient to maintain the particles in the reaction zone at the desired temperature as set forth above.

The cooling and collection of the product is carried out in a controlled temperature region maintained at from 50° C. to 350° C., or more preferably from 50° C. to 200° C. The product stream leaving the combustion zone may be cooled by passage through condensers or by quenching, such as by the addition of cool air or other vapors and liquids, for example, water. A preferred method of operation is to collect the product in a spray tower using a water spray to cool and collect the oxides.

The following examples illustrate specific embodiments of the present invention.

*Example 1*

The preparation of an intimate admixture of silica with carbon black was carried out in a quartz tube reactor provided with a multiple nozzle feed. The charge to the reactor was 0.91 cc. per minute of silicon tetrachloride which was vaporized by dropping a steady stream of the liquid silicon tetrachloride into a heated vaporizer. The gas stream fed to the reactor was composed of 1,300 cc. per minute of hydrogen and 570 cc. of acetylene which were burned as a diffusion flame in air utilizing a deficiency of air in order to obtain a reducing flame. The test was conducted for a period of 220 minutes with a flame temperature of 1190° C. to obtain a product which contained 13.73% carbon with the remainder being silica. The product had an average particle size of 650 angstroms and was a dense black material.

*Example 2*

In order to show the use of the silica-carbon black product of Example 1 as a pigment, the said silica-carbon black mixture was ground with linseed oil. The ground material containing about 76% of linseed oil was found to have a very high top color (blackness) and was very much darker in color than a commercial sample of lamp black or medium channel black utilized under the same conditions. The deep blackness of the present oxide-carbon black combination is therefore very desirable in the manufacture of printing inks, colored cements, and oil or water paints, for which a deep black color is required. It was also found that this oxide-carbon black combination has excellent miscibility with water, which is of advantage in the preparation of water base paints.

*Example 3*

The use of a solution of silicon tetrachloride in benzene as the starting material is shown in the present example. A solution was prepared containing 100 g. of silicon tetrachloride in 1,000 g. of benzene. This solution was fed at the rate of 5 ml. per minute to a quartz tube reactor with an atomizing system in which the solution of silicon tetrachloride was atomized by means of a stream of air. The combustion was conducted with a deficiency of oxygen while maintaining a reducing flame. The product obtained was similar to that of Example 1.

*Example 4*

A product composed of an intimate admixture of alumina and carbon black was prepared utilizing a vertical ceramic vessel as the reactor with the reactants fed from the top and with the product collected at the bottom by means of a wet collection system. The solution fed to the reactor was a solution of 5 lbs. of aluminum sulfate containing 18 moles of water per mole of the aluminum sulfate. This mixture was fed at the rate of 7.2 lbs. per hour to the vertical reactor and was atomized through an atomizing nozzle fed with 4.2 lbs. per hour of natural gas. The annulus of the multiple burner was fed with 5.3 lbs. per hour of acetylene and the air admitted to the system amounted to 150.2 lbs. per hour to produce an oxygen-containing reducing flame. The flame temperature as measured by an optical pyrometer was about 1,100° C. The product produced was as a densely black admixture of 87.4% by weight of alumina and 11.6% by weight of carbon. Examination of the product under an electron microscope showed that the alumina existed as discrete particles having a flake-like shape, while the carbon particles existed as spherical units. The average particle size of the carbon present was about 400 angstroms.

*Example 5*

The production of an intimate admixture of titanium dioxide with carbon black was conducted utilizing the vertical reactor of Example 4. The feed to the nozzle was 1.45 lbs. per hour of anhydrous titanium tetrachloride. The titanium compound was vaporized by feeding the salt was 4.2 lbs. per hour of natural gas as the atomizing gas. The reactor was also fed with 5.6 lbs. per hour of acetylene and 154.9 lbs. per hour of air. The product obtained was found to contain 73.8% by weight of titanium dioxide having an average particle size of 1,000 angstroms together with 25.5% by weight of carbon having an average particle size of 350 angstroms. Examination of the product under the electron microscope indicated that both the titanium dioxide and the carbon black particles existed in spherical forms.

*Example 6*

The production of an intimate admixture of vanadium oxide with titanium dioxide and carbon black as a starting material intended for carbide production is shown in the present example. The apparatus employed was the vertical reactor described in Example 4. The feed to the nozzle was 1.45 lbs. per hour of an equal molar mixture of titanium tetrachloride and vanadium tetrachloride was vaporized by feeding the liquid salts with 4.2 lbs. per hour of natural gas as the atomizing gas. The combustion gas fed to the reactor was acetylene, introduced at the rate of 5.7 lbs. per hour, together with 154.9 lbs. per hour of air. The product was an intimate mixture of vanadium oxide, titanium dioxide, and carbon black. This product was suitable for the preparation of a titanium-vanadium carbide by means of a high-temperature heating step in which the carbon present in the composition serves to remove the oxygen content to a controlled degree in order to form the combination of carbides of titanium and vanadium in equimolar stoichiometric relationship.

*Example 7*

A grease was prepared by mixing 100 grams of heavy lubricating oil (SAE 30) with 10 grams of the oxide product of Example 4. The product was found to have thickened considerably and to maintain its consistency even when heated. The presence of the finely divided admixture of alumina and carbon black has been found to provide a generally useful base for lubricating compositions. Other oxides in combination with the carbon black for this purpose are silica, molybdena, lead oxide, and chromium or vanadium oxides. The hydrocarbon components employed in the present grease compositions include paraffin, paraffin oil, etc. and may also be modified by the presence of soaps such as a calcium stearate soap.

What is claimed is:

1. A process for the production of an intimate admixture of carbon black with an oxide selected from the group consisting of the oxides of boron, silicon, aluminum, titanium, zirconium, zinc, lead, tin, iron, cobalt, nickel, manganese, chromium, vanadium, molybdenum, niobium and tantalum, which comprises oxidizing a compound selected from the group consisting of the chlorides, bromides, iodides, nitrates, acetates, oxalates and tartrates of the said metal in vapor form in an oxygen-containing reducing flame, the said flame being supplied with an unsaturated hydrocarbon having from 2 to 8 carbon atoms, the proportion of the carbon black being from 10% to 50% by weight.

2. A process for the production of an intimate admixture of carbon black with an oxide selected from the group consisting of the oxides of boron, silicon, aluminum, titanium, zirconium, zinc, lead, tin, iron, cobalt, nickel, manganese, chromium, vanadium, molybdenum, niobium and tantalum, which comprises oxidizing a compound selected from the group consisting of the chlorides, bromides, iodides, nitrates, acetates, oxalates and tartrates of the said metal in vapor form in an oxygen-containing reducing flame, the said flame being supplied with acetylene, the proportion of the carbon black being from 10% to 50% by weight.

3. A process for the production of an intimate admixture of carbon black with an oxide selected from the group consisting of the oxides of boron, silicon, aluminum, titanium, zirconium, zinc, lead, tin, iron, cobalt, nickel, manganese, chromium, vanadium, molybdenum, niobium and tantalum, which comprises oxidizing a compound selected from the group consisting of the chlorides, bromides, iodides, nitrates, acetates, oxalates and tartrates of the said metal in vapor form in an oxygen-containing reducing flame, the same flame being supplied with benzene, the proportion of the carbon black being from 10% to 50% by weight.

4. A process for the production of an intimate combination of silica and carbon black which comprises oxidizing silicon tetrachloride in vapor form in an oxygen-containing reducing flame fed with acetylene, the said oxidation being conducted at a flame temperature of 800° C. to 1,300° C. for a period of time of from 0.5 second to 0.001 second, the proportion of the carbon black being from 10% to 50% by weight.

5. A process for the production of an intimate combination of alumina and carbon black which comprises oxidizing aluminum sulfate in vapor form in an oxygen-containing reducing flame supplied with acetylene, the said oxidation being conducted at a flame temperature of 800° C. to 1,300° C. for a period of time of from 0.5 second to 0.001 second, the proportion of the carbon black being from 10% to 50% by weight.

References Cited in the file of this patent

UNITED STATES PATENTS

| | | |
|---|---|---|
| 1,999,573 | Odell | Apr. 30, 1935 |
| 2,156,591 | Jacobson | May 2, 1939 |
| 2,258,438 | Barton | Oct. 7, 1941 |
| 2,356,471 | Rehner | Aug. 22, 1944 |
| 2,632,713 | Kregci | Mar. 24, 1953 |
| 2,696,469 | O'Halloran | Dec. 7, 1954 |

FOREIGN PATENTS

| | | |
|---|---|---|
| 572,860 | Great Britain | Oct. 26, 1945 |
| 912,846 | Germany | June 3, 1954 |

OTHER REFERENCES

Riffault et al., "Manufacture of Colors," pages 184 and 185.

Webster's New International Dictionary, 2nd Edition (Unabridged), 1959, page 1095.

Gehman et al.: Analytical Ed. Industrial and Engineering Chemistry, vol. 4, No. 2, Apr. 15, 1932, page 157.

Hackh's Chemical Dictionary, 2nd Edition, 1937, page 594.